Dec. 24, 1940.  W. D. HALL  2,225,941
CONDITION-RESPONSIVE DEVICE
Filed Jan. 8, 1936
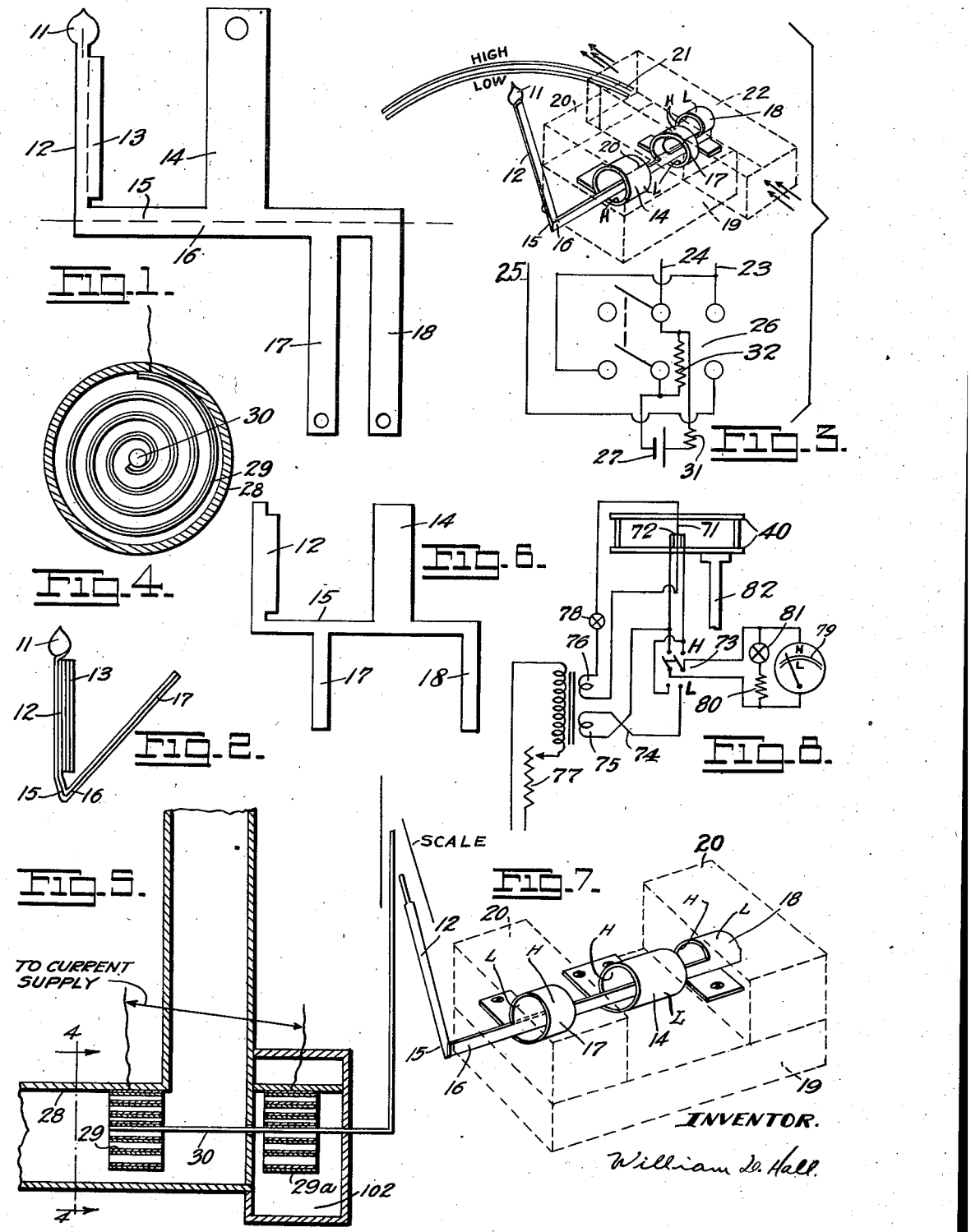
INVENTOR.
William D. Hall Patented Dec. 24, 1940

2,225,941

UNITED STATES PATENT OFFICE 2,225,941

CONDITION-RESPONSIVE DEVICE

William D. Hall, Elkins, W. Va.

Application January 8, 1936, Serial No. 58,122

20 Claims. (Cl. 73—204)

This invention relates to condition responsive devices and has for its objects the provision of means for measuring the speed of the wind; means for reducing the errors occasioned by the voltage changes of wind indicating devices; means for measuring only a predetermined component of the wind velocity, and the provision of a novel arrangement of bimetallic strips as will be hereinafter described and claimed.

In this specification, I use the term "wind" in a very general manner since the principles involved are applicable to devices for measuring the speed of any substance whether such substance is in a free state or is confined in a pipe.

I recognize that the basic idea of measuring the speed of the wind by employing a thermal element which is heated by an electrical current and cooled by the wind is not new. However, I have found that by utilizing a bimetallic strip which is heated by a flow of current therethrough, a wind indicator may be produced which is not only more sensitive than other forms of wind indicators, but also more rugged and less expensive than the other types of wind indicators. A bimetallic strip has a large surface area as compared with its cross-sectional area, and therefore, the heat generated in the strip is carried away more efficiently than it is when the conductor is of circular cross-section. The direct passage of the current through the bimetallic member produces an instrument having high efficiency and reliability. By utilizing a second bimetallic strip, it is possible to insure that errors due to ambient temperature variations are small, and furthermore it is possible to reduce voltage errors of the instrument. The claims are not limited to "strips" or to the passage of current directly through the heated element unless there is a specific recitation of these features therein.

In the drawing, Figure 1 is a schematic view of a bimetallic stamping which may be formed into a wind indicator. Figure 2 illustrates the stamping of Figure 1 after the first few steps of the formation process. Figure 3 illustrates an assembled wind indicating device. Figure 4 illustrates a method of utilizing the invention to measure the speed of a moving substance through a pipe and is a sectional view along line 4—4 of Figure 5. Figure 5 illustrates a mounting arrangement which may be used when the speed of a substance through a pipe is to be measured. Figure 6 illustrates a modified form of bimetallic stamping and Figure 7 shows schematically an assembled wind indicator which uses the stamping of Figure 6. In Figure 8 is shown a schematic diagram of a device for measuring the speed of the wind.

In Figure 1 is illustrated a bimetallic stamping having a cross-arm 15 with two arms 12 and 14 and two legs 17 and 18 attached thereto. The width of the arm 14 is equal to the sum of the widths of legs 17 and 18. Legs 17 and 18 have holes in them through which bolts may be placed to secure the bimetallic element to the supporting structure of the instrument. The dash lines indicate that the stamping is to be bent along that axis. For example in forming the stamping to the proper shape, the cross-arm 15 is bent such that the lower half thereof 16 forms a channel with the upper half 15. Similarly, the portion 13 of arm 12 is bent to form a channel with the arm 12. The end 11 of arm 12 is bent through a 90 degree angle in order to form a pointer. Figure 2 shows the stamping of Figure 1 during the channeling operations. The completed assembly is shown in Figure 3 where legs 17 and 18 and arm 14 are shown secured to the supporting base 19 which carries a wind conducting tube 22 and a wind-insulating enclosing casing 20. Enclosing casing 20 is intended to prevent the wind from affecting strip 14 whereas tube 22 is intended to permit a predetermined component of the wind to pass over legs 17 and 18. The scale 21 has two sets of calibrations for different orders of magnitude of the wind speed. Electrical conductors 23, 24 and 25 respectively connect to the supported ends of bimetallic strips 18, 17 and 14. The flash light battery 27 has a resistance wire 31 in series therewith, which resistor is preferably of material having a high temperature coefficient of resistance whereas the carbon resistor 32 has a negative temperature coefficient of resistance. The double pole, double throw toggle switch 26 is used to shift the device from the high to low values of scale 21. For example, if a very strong wind is to be measured, switch 26 is thrown to the left and readings taken from the "high" scale. The high scale is calibrated with the smaller values at the left, progressing to an infinite value at the position of the pointer shown. The low scale is calibrated from zero at the present position of the pointer to a moderate wind speed at the end 21. The stamping of Figure 6 may be used as shown in Figure 7, in which event the legs 17 and 18 are insulated from the wind currents and the leg 14 exposed thereto. A better balance is obtained with this arrangement but it is necessary to use two wind shields 20. The sheet of bimetal from which the stampings are made should be very thin, say in the order of 0.001" to 0.002" thick. This thin bimetallic sheet may be produced by rolling a thicker strip to 0.001 or 0.002 inch of thickness. It is possible to use thicker strips and heat them with an adjacent heating wire such as is illustrated in my prior copending application S. N. 739,886, filed on August 15, 1934.

The side of the stamping of Figure 1 which faces the reader is composed of a material having a high coefficient of expansion, whereas the underside of this stamping is composed of material having a negligible coefficient of expansion. In Figure 3, the high expansive layer H is on the inside of coil 14 and accordingly, this coil tends to move clockwise as its temperature increases. The channeling operation hereinbefore mentioned paralleled strips 14 and 17 (as shown in Figure 2), and therefore the high expansive layer H is the outside layer of coil 17, whereas the low expansive layer L is the inside layer of this coil. Hence, as the temperature of this coil increases the coil tends to move the pointer counterclockwise. Since strips 17 and 18 are coiled in opposite directions, and are integral, it becomes apparent after careful examination that the outer layer L of strip 18 is the low expansive layer, whereas the inner layer H is composed of the high expansive material. As the temperature of strip 18 rises, the strip will tend to move counterclockwise. Since cross-arm 15 is channeled, it has no tendency to bend in any direction, and accordingly, it will move in response to the summation of the torques exerted thereon by coils 14, 17, and 18. In response to variations in ambient temperature, the strip 14 will tend to move but will be opposed by the equal and opposite torque exerted by strips 17 and 18. The pointer itself is channeled and will not be affected by ambient temperature changes.

I think a very novel and quite practical feature of my invention resides in the fact that the ambient temperature compensating strip 14 is heated as well as strips 17 and 18. This feature reduces errors occasioned by voltage changes of the battery. When switch 26 is thrown to the right, the strips 17 and 18 are connected in parallel with each other and in a series relationship with strip 14, hence, in the absence of air currents all three strips attain the same temperature. Since the combined torques of strips 17 and 18 are equal to the torque of strip 14 and opposites thereto, there is no appreciable movement of the pointer. When the voltage of the battery changes, this condition is not disturbed and it is accordingly obvious that voltage changes of the battery do not cause appreciable errors in indications when low velocities are measured. If wind passes over strips 17 and 18, they are cooled and their torques reduced, and accordingly, the torque of strip 14 (which strip is not cooled) overcomes the torques of strips 17 and 18 thereby moving the pointer clockwise. At high wind velocities, the error due to voltage changes of the battery has been found to be less when strips 17 and 18 alone are heated than when all three strips are heated, and therefore I have arranged switch 26 such that it may be thrown to the left position wherein strips 17 and 18 are connected in series with each other.

Experimentation has revealed that if the device is used in the presence of fairly intense heat such as sun rays, the chemical action of the battery 27 is increased and an excessive current will tend to flow in the circuit. To overcome this disadvantage, I have placed the carbon resistor 32 in parallel with switch 26. When the voltage of the battery is high, the carbon resistor will draw more current than when the E. M. F. of the battery is low. The increased current through resistor 32 creates a drop in resistor 31 such that the current flowing through the bimetallic strips generates the proper amount of heat to operate the device without excessive errors. The potential of the battery may be checked (in the absence of the passage of wind over the strips) by throwing switch 26 to the left position thereof.

In Figure 4 is illustrated a pipe 28 having a bimetallic coil 29 therein which connects to a shaft 30. As illustrated in Figure 5, a second bimetallic coil in casing 102 is positioned in contact with the liquid of the pipe but in a position insulated from movements of the liquid. Liquid may seep into the outer chamber 102 but will not move in said chamber with any appreciable velocity.

Bimetallic coils 29 and 29a are connected in series with the current supply. When the fluid in pipe 28 is not moving, both strips exert equal and opposite torques on the shaft 30. When the fluid in pipe 28 moves, strip 29 is cooled to a greater extent than is strip 29a hence the shaft 30 is rotated an amount dependent upon the speed of the fluid.

The modified form of Figure 8 is shown as a permanent installation in which the pole 82 supports the parallel plates 40 in the wind currents which are to be measured. The vertical heating wire 71 has a thermocouple 72 connected thereto. The double pole double throw switch 73 serves the same purpose as the switch 26 of Figure 3. When it is thrown to the "H" position the thermocouple 72 energizes the instrument 79 directly. When the switch 73 is thrown to the "L" position the thermocouples 72 and 74 are connected in series, with their potentials reversed, hence when both are heated the same amount the instrument 79 will read zero. The exciting transformer has independent secondaries 75 and 76 in order that alternating current cannot flow in the thermocouple circuit. The single pole single throw switches 78 and 81 are used for adjusting purposes. Resistor 80 is used in making adjustments, as is resistor 77.

In Figure 8 accuracy is maintained on both low and high wind velocities by use of the double throw switch. In this case, the thermocouple 74 is adapted to supply sufficient E. M. F. to cause millivoltmeter 79 to read double of full scale value. When there is no wind the thermocouple 72 generates an E. M. F. opposite to the E. M. F. of thermocouple 74 and there will be no reading. When there is a very strong wind the switch 73 is thrown to the "high" position. With the switch 73 in the low position it is possible to check the line voltage by closing switch 81 to place a low resistance 80 in parallel with instrument 79. On opening switch 78 it is possible to adjust the line E. M. F. to a predetermined value with resistance 77.

I claim:

1. A measuring device comprising, indicating means having two sections, means for energizing said sections, whereby variations in the energizing means will similarly affect both of said sections, means whereby the degree of energization of one of said sections is affected by the variations in the measured quantity, and means operatable to place said indicating means selectively responsive to either the difference in the degree of the energizations of said sections or to the energization of just said one section alone.

2. In a device responsive to the speed of a moving substance, a bimetallic member, means supporting said member to position the same in the path of movement of said substance, means for heating the member by passing an electric current directly through the member generating heat therein and means responsive to the deflection of the member.

3. A current-responsive device comprising a sheet of bimetal having a cross-member and a developed area including two arms extending outwardly in opposite directions, said cross-member being channeled to form a U-shaped member having said arms for the legs of the U, means supporting the ends of said arms to fix the same, means whereby one of said arms is heated by an electric current, and means responsive to the deflection of said cross-member.

4. A device responsive to a characteristic of a moving substance comprising a metallic element which expands when heated and contracts when cooled, an electrical current path for heating said element means supporting said element to expose the same in the path of movement to the heat-carrying-away effect of said substance, whereby the degree of expansion of the element depends on the speed of the substance, and a second element which compensates the device for errors due to ambient temperature changes.

5. A device as defined by claim 4 which includes a casing surrounding said first element, said casing having an opening therein arranged to expose said element to said substance.

6. A wind indicating device comprising bimetallic means having two oppositely actuated sections to compensate for ambient temperature changes, one of which is heated by an electrical current, means supporting the bimetallic means solely at the end of one or more of said sections, whereby to eliminate friction and bearings, said heated section being exposed to the wind, whereby to cool the same in accordance with the speed of the wind, and means responsive to the deflection of said bimetallic means.

7. A device which responds to a characteristic of a moving substance comprising means which changes its dimensions when its temperature changes, means for heating said first-mentioned means, means whereby the device may be so supported in the path of movement of said substance that the temperature of said first-mentioned means depends on the speed of said substance, additional means which changes its dimensions when its temperature changes and is arranged to reduce the error caused by ambient temperature changes, and means responsive to the difference of said dimension-changing tendencies.

8. A device responsive to a characteristic of a moving substance comprising a pair of metallic elements, means supporting one end of each of said elements, connecting means between the other ends of said elements, means actuated by said connecting means responsive to the difference of the shape-changing tendencies of said elements, means whereby heat is supplied to one of said elements, and means whereby the device may be so positioned in the path of movement of said substance that the temperature change of said heated element depends on the speed of said substance to a greater extent than the temperature of the other element depends on said speed.

9. A device of the kind described for indicating fluid flow comprising a bimetallic strip, means supplying heat thereto, means supporting said strip and directing the flowing fluid across it whereby its temperature rise depends on the speed of said substance, an indicator including an element actuated by said bimetallic strip, and a second bimetallic strip cooperating with said indicator for compensating the errors due to ambient temperature changes.

10. A device responsive to a characteristic of a moving substance comprising a pair of dissimilar metals joined together to form a force-producing device actuated by temperature changes, means for passing a current through at least a portion of at least one of said metals such that the heating caused by the direct passage of current through said metal generates sufficient heating effects to raise the temperature of said metals at their junction a substantial amount, a second junction of dissimilar metals, said junctions being so related that their generated forces oppose each other, means directing the moving substances over the heated junction, and means responsive to the resultant force produced by said junctions.

11. In a device responsive to a characteristic of a moving substance, means having two heat sensitive expansible and contractable sections, said means being so constructed and arranged that it responds in accordance with the difference between the size of said sections, means whereby the temperature of one of said sections is changed appreciably from the temperature of said moving substance and supporting means whereby said one section may be exposed in the path of movement of said substances.

12. In a device for indicating fluid flow, thermal sensitive means having two sections arranged such that said means responds in accordance with the difference in temperature of said sections, means selectively operable to displace from the ambient fluid temperature either the temperature of just the first section alone or of both sections simultaneously, means directing the flowing fluid over the first section, and means insulating the second section from movements of the fluid.

13. In an electrically actuated mechanism, indicating means having two sections and including means for giving indications in accordance with the difference in the degree of the energizations of said sections, said indicating means being so constructed that the degree of energization of the first section varies in accordance with the quantity to which the mechanism is intended to respond, a source of electricity, and a switch connected such that either the first section alone or both sections simultaneously may be selectively energized by said source of electricity.

14. The device defined by claim 2 in which the bimetallic member is a very thin strip of bimetal of short length and in which the recited last-means is a pointer attached to said strip at a point thereof remote from said supporting means, whereby a very sensitive, light weight, and low energy consuming fluid-speed indicator is obtained.

15. A device responsive to the speed of a moving substance comprising an electrical conducting element which changes its dimensions when heated and cooled, means for passing sufficient current through said element to effect change in the dimensions thereof, means supporting said element in the path of movement of said substance whereby to cool the same in accordance with the speed of said substance, and means responsive to changes in the dimensions of the element.

16. In a wind responsive instrument; a thermocouple which is located so as not to be affected by variations in the wind; a second thermocouple which is located in the path of movement of the wind; an electrical instrument connected to read the difference in the generated electromotive forces of the thermocouples; and electrical means including switching means connected such that either just the first thermocouple or both thermocouples may be heated.

17. In a wind responsive instrument, a thermocouple which is located so as not to be affected by variations in the wind, a second thermocouple which is located in the path of movement of the wind, means for supplying heat to both thermocouples, an electrical indicating instrument, and switching means connected such that either the output of the second thermocouple alone or the difference in the outputs of both thermocouples may be impressed upon said electrical indicating instrument.

18. In a wind responsive instrument, indicating means, a pair of bimetallic strips mechanically interconnected such that they affect said indicating means according to their difference in temperature, means for supporting one of said strips in the path of movement of the wind, means insulating the other strip from the movement of the wind, and means for heating both of said strips appreciably, said heating means being arranged to heat both strips to the same temperature when there is no wind movement across the said strip that is supported in the wind.

19. In a wind indicating instrument, a wind tube, a coiled bimetallic strip located inside said tube and having an outer end rigidly supported by the tube, a shaft connected to the inner end of said coil and extending through the wall of said tube at right angles to such wall, a pointer connected to said shaft at a point thereon outside said tube, a scale cooperating with said pointer, and means for heating the strip whereby the latter will attain a temperature above the temperature of the wind and whereby the difference in the temperature of the bimetallic strip and the temperature of the wind will depend on the speed of the wind.

20. In a measuring device of the bimetallic strip type; a cross-member including electrical conducting material; a pair of torque producing bimetallic strips having their inner ends rigidly mechanically and electrically connected to said cross-member; means rigidly supporting the outer ends of both of said bimetallic strips; said bimetallic strips being disposed to exert opposing torques on said cross-member in response to ambient temperature variations; means for giving indications in accordance with the deflection of said cross-member comprising a graduated scale; and means for effecting a difference in temperature between the said oppositely acting bimetallic strips comprising a pair of electrical conductors each respectively connected to the outer ends of said strips for passing sufficient current through the series arrangement of said conductors, strips, and cross-member to effect a substantial torque by each of said strips, the last-named means including means whereby said temperature difference bears a relation to the quantity to be measured.

WILLIAM D. HALL.